Figure 1:
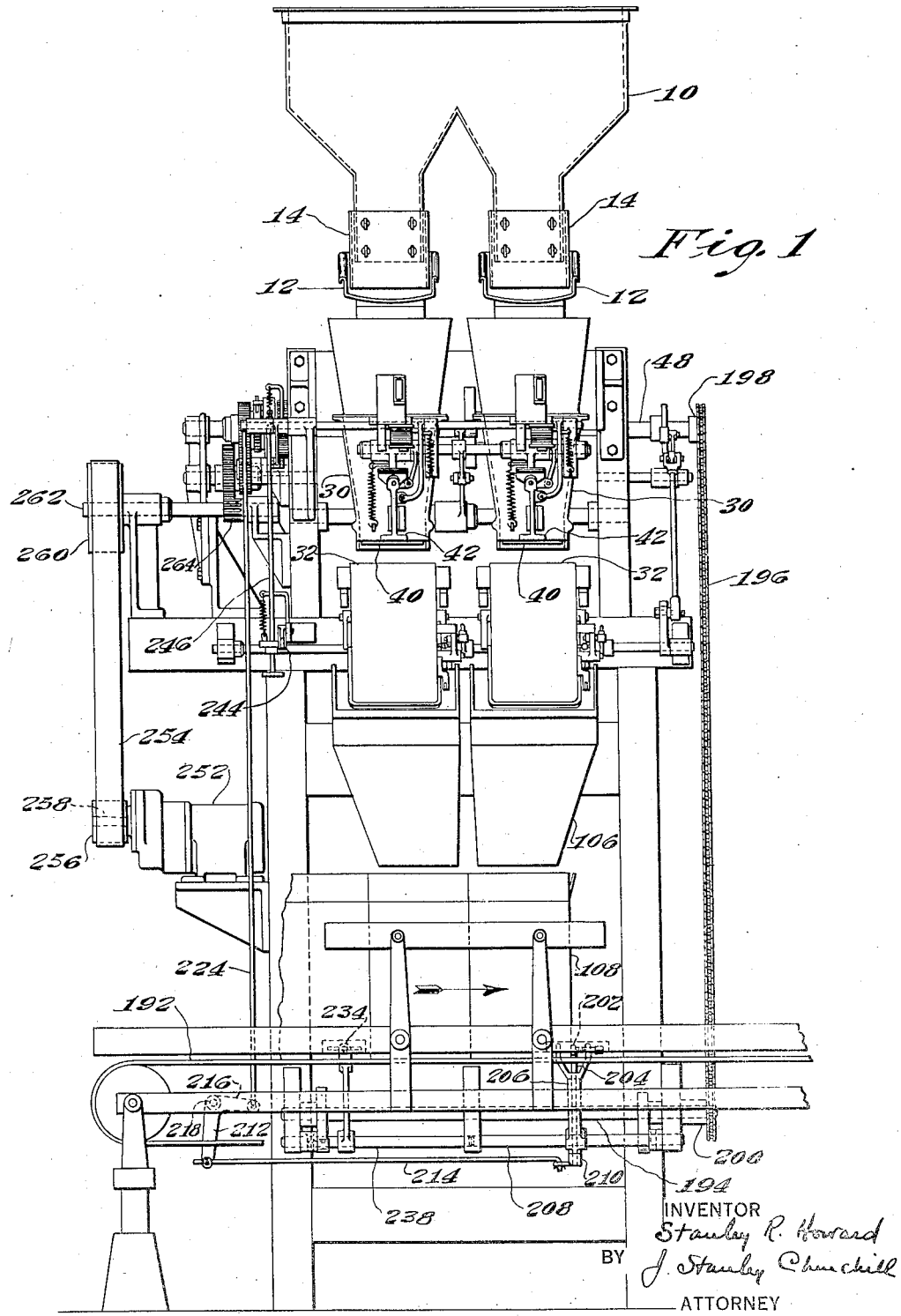

March 21, 1939.  S. R. HOWARD  2,151,107
WEIGHING MACHINE
Filed July 16, 1936  4 Sheets-Sheet 1

INVENTOR
Stanley R. Howard
BY J. Stanley Churchill
ATTORNEY

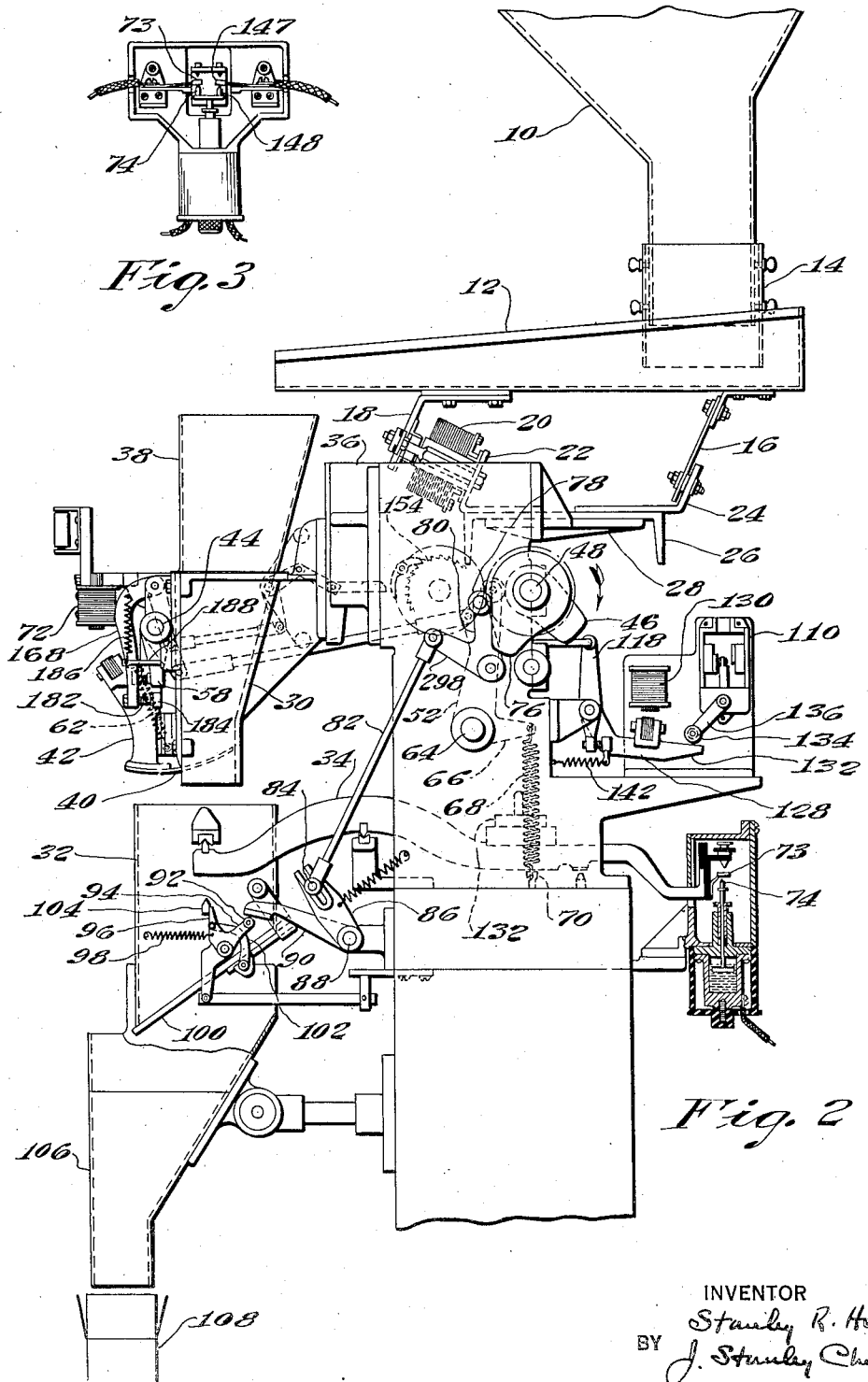

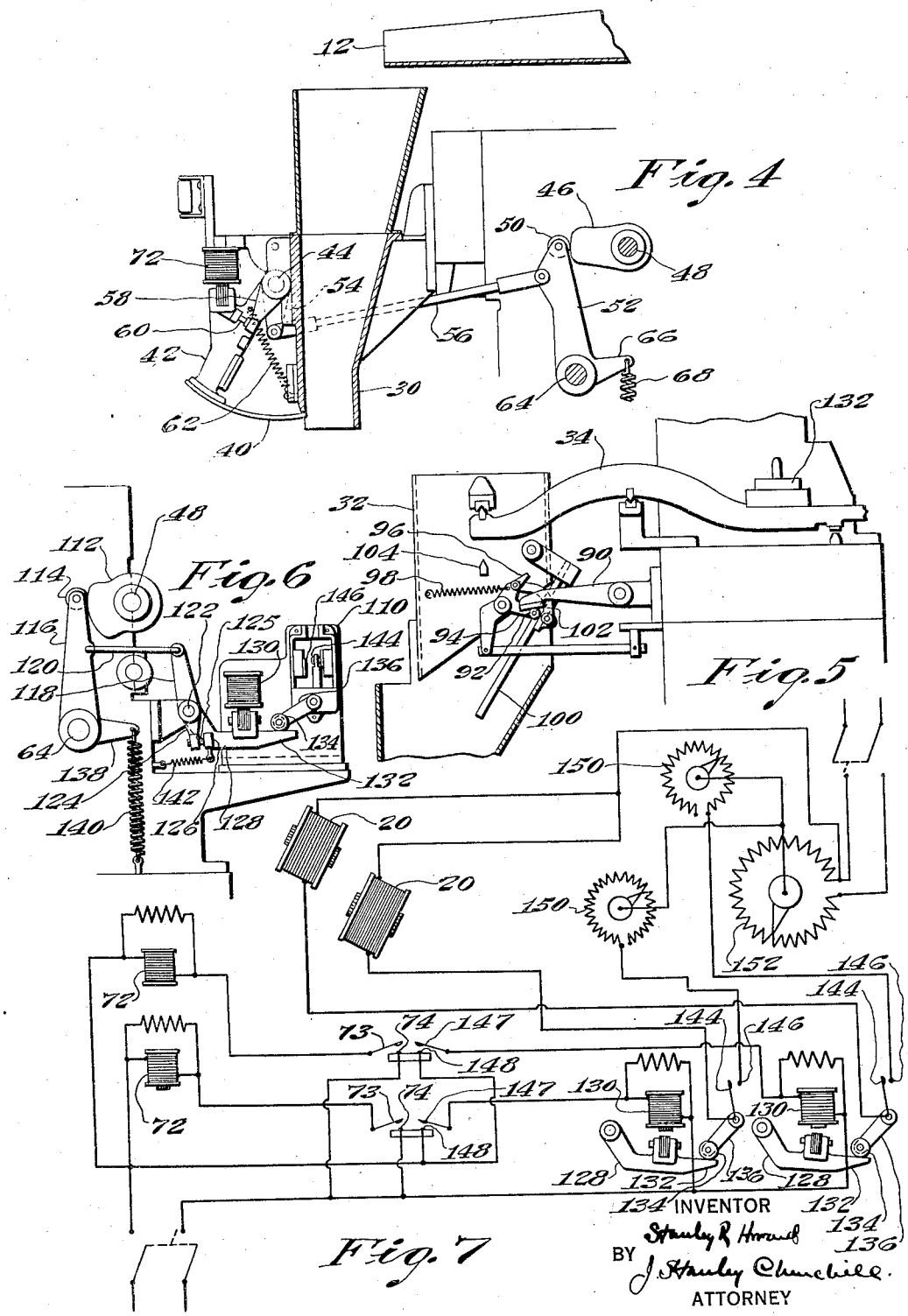

March 21, 1939. S. R. HOWARD 2,151,107
WEIGHING MACHINE
Filed July 16, 1936 4 Sheets-Sheet 4
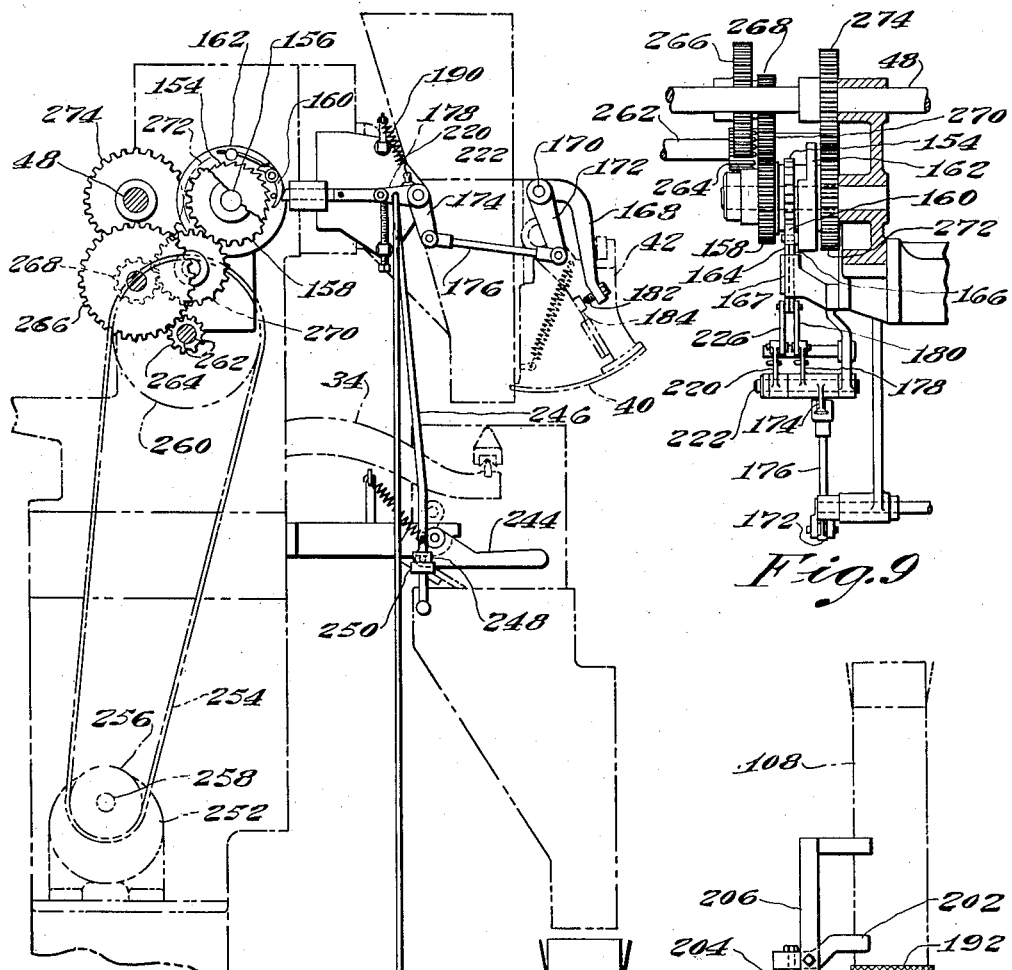
*Fig. 8*
*Fig. 9*
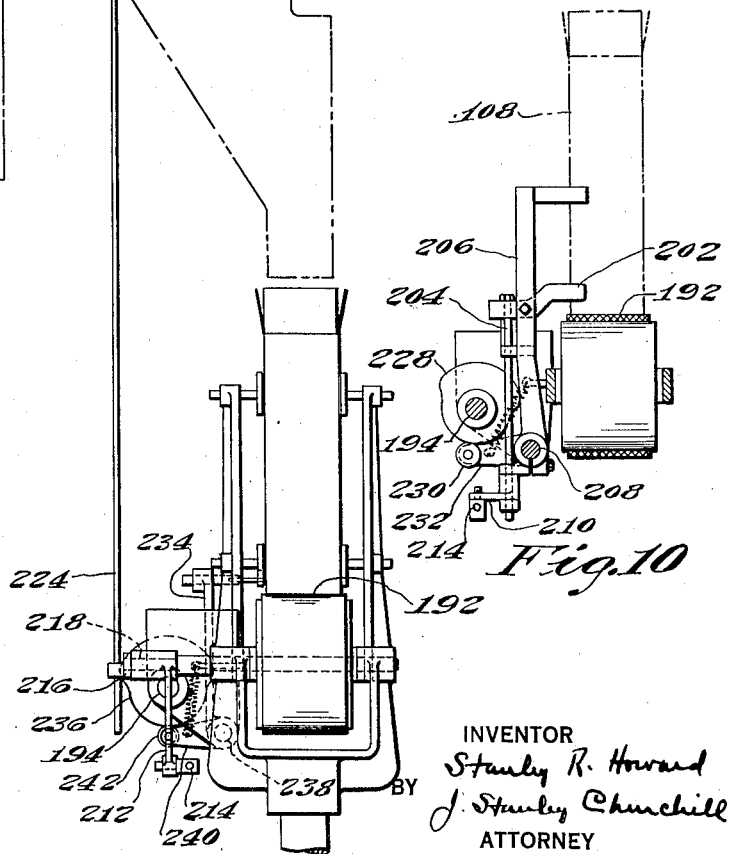
*Fig. 10*
INVENTOR
Stanley R. Howard
BY J. Stanley Churchill
ATTORNEY Patented Mar. 21, 1939

2,151,107

UNITED STATES PATENT OFFICE 2,151,107

WEIGHING MACHINE

Stanley R. Howard, Milton, Mass., assignor to Pneumatic Scale Corporation, Limited, Quincy, Mass., a corporation of Massachusetts Application July 16, 1936, Serial No. 90,907

5 Claims. (Cl. 249—63)

This invention relates to a weighing machine and more particularly to an automatic weighing machine.

The invention has for one of its objects to provide a novel weighing machine in which provision is made for feeding the flowable solid material to be weighed onto the weighing end of a scale beam in such manner as to enable more accurate weights to be obtained with varying grades and densities of materials than has heretofore been possible with any commercial form of weighing machine of which I am aware.

A further object of the invention is to provide an automatic weighing machine embodying a plurality of weighing units and in which provision is made for delivering the material to be weighed onto the weighing end of the scale beams by a plurality of mechanisms each including a vibratory feeding unit, and provision is made for controlling the vibration of the individual vibratory feeding units by mechanism arranged so that the control of the vibration for one unit does not materially disturb or affect the operation of any of the other units.

With these general objects in view and such others as may hereinafter appear, the invention consists in the weighing machine and in the various structures, arrangements and combinations of parts hereinafter described and particularly defined in the claims at the end of this specification.

In the drawings illustrating the preferred embodiment of the invention, Fig. 1 is a front elevation of a multi-unit weighing machine embodying the present invention; Fig. 2 is a partial side elevation of the machine shown in Fig. 1, viewed from the right; Fig. 3 is a detail view of an electric switch, to be referred to; Fig. 4 is a detail partly in side elevation and partly in section, showing the hopper in open position; Fig. 5 is a detail showing the scale bucket in open position; Fig. 6 is a detail in side elevation of an electric switch, to be referred to; Fig. 7 is a wiring diagram showing the circuits for controlling the vibration of the feeding conduit; Fig. 8 is a view looking from the left in Fig. 1, showing the driving and controlling connections; Fig. 9 is a plan view of the controlling connections shown in Fig. 8 and Fig. 10 is a detail in side elevation of the package conveyor, to be referred to.

In general, one feature of the present invention contemplates a weighing machine which is capable of weighing with accuracy flowable solid materials whose flow characteristics vary over a wide range to thereby enable the machine to be used and to operate efficiently for weighing a maximum number of the different commercial materials.

To this end the machine is provided with material feeding means including a feeding conduit mounted to be capable of being vibrated and with means for effecting vibration thereof to cause material to flow therethrough. The machine is also preferably provided with a chamber through which the material is discharged from the delivery conduit onto the scale beam, and provision is made for cutting off the flow of material from such chamber when the scale beam has made its weight and also preferably for controlling the vibration so as to effect an accumulation or partial accumulation of the next succeeding load within said chamber. In the preferred embodiment of the invention the material delivery conduit is arranged to be oscillated or vibrated through relatively small arcs but at relatively high frequency, preferably by an electrically operated vibratory motor by which it is possible to vibrate the material delivery conduit at frequencies of from three to seven thousand vibrations per minute, and as a result of the effect upon the material delivery conduit various flowable solid materials may be caused to flow through the conduit in a uniform stream irrespective of the flow characteristics of the material over a wide range.

Another feature of the invention resides in the provision of a multi-unit weighing machine in which provision is made for feeding the material to be weighed onto the several scale beams by individual material feeding mechanisms each including a material delivery conduit and means for effecting vibration thereof, and provision is made for controlling the vibration of the individual conduits without disturbing or affecting the amplitude of vibration of the remaining conduits. In the illustrated machine embodying this feature of the invention and in which the vibration of each delivery conduit is effected by an electrical vibratory motor, an auto-transformer is utilized for permitting the individual electrically operated vibratory motors to be stopped and started or otherwise controlled without affecting or disturbing the operation of the remaining motors of the several units.

Referring now to Figs. 1 and 2, 10 represents the storage hopper for the bulk supply of material to be weighed and from which the material flows by gravity into the material delivery conduits 12 of each unit. The supply hopper 10 is provided with adjustable sleeves 14 for varying the amount of material permitted to flow into the conduits 12 and the latter are arranged to be vibrated to feed the material through the conduits in a uniform stream. As herein shown, each delivery conduit 12 is mounted to vibrate through connections including a thin steel strap 16, at one end, and a second strap 18 at the other end is connected to an electrically operated vibratory motor 20 of any usual or preferred structure. Each vibratory unit is mounted on angle straps 22, 24 secured to a channel iron base 26 which is in turn mounted on brackets 28 secured to the machine frame.

Provision is made for initiating the vibration of each delivery conduit as will be hereinafter described, to feed the material, first through an accumulating hopper 30 and thence into a weighing bucket 32 mounted upon one end of a scale beam 34 and provision is made for stopping the vibration of the delivery conduit 12 and for cutting off the supply of material through the accumulating hopper 30 by the movement of the scale beam 34 when the scale has made its weight. As herein shown, the hopper 30 comprises a funnel shaped member adjustably mounted upon a bracket 36 secured to the machine frame and is provided with an extension 38 positioned to receive the material from the mouth of the delivery conduit. The hopper 30 is further provided with a shutter 40 mounted upon an arm 42 loosely mounted upon a shaft 44 journaled in suitable bearings secured to the hopper 30. Provision is made for opening the shutters 40 of each unit from the position shown in Fig. 2 to the position shown in Fig. 4, by a cam 46 secured to a cam shaft 48, and through connections including a cooperating roller 50 mounted on a lever 52 connected to a lever 54 by a rod 56. The lever 54 is fixed to the shaft 44 and operates to open the shutter through a second lever 58 also fixed to the shaft 44. The end of the lever 58 is provided with a bearing surface arranged to engage a stud 60 extending from the shutter arm 42 so that during the operation of the machine, when the cam shaft 48 revolves, the shutter will be moved from the operation shown in Fig. 2 to the position shown in Fig. 4. The shutter is normally held in its closed position by a spring 62 one end of which is secured to the hopper and the other end to the arm 42. The cam lever 52 which is pivoted on a shaft 64 is provided with a second arm 66 and a spring 68 connects the arm to a stud 70 secured to the machine frame to hold the roller 50 against its cam 46. Through the connections described, the shutters 40 of all of the units are opened simultaneously through the operation of the cam 46 and as will be described this action occurs at the beginning of each cycle of operation of the machine.

Provision is made for retaining the shutter 40 in its open position, during the weighing period, and as herein shown, the arm 42 is provided with the movable member of a standard form of electromagnet, indicated generally at 72. As will be described, the electromagnet 72 is wired to contact members 73 with which a movable contact 74 upon the end of the scale beam 34 co-operates, so that when the scale beam makes its weight, the electromagnet is de-energized, thereby freeing the shutter 40 and permitting the spring 62 to move the shutter to its closed position.

At the end of the weighing operation, when the scale has made its weight, provision is made for dumping the material from the weighing bucket 32, and as herein shown this is accomplished by a cam 76 on the cam shaft 48 cooperating with a cam roller 78 on one arm 80 of a bell crank, the second arm 298 of which is connected by a link 82 and through a pin and slot connection 84, to a lever 86 secured to a cross shaft 88 journalled in suitable bearings in the machine frame. The cross shaft 88 is provided with a gate operating arm 90 for each unit, and each arm cooperates with a roller 92 on a bell crank 94 pivoted upon the side of the weighing bucket 32. The second arm 96 of the bell crank is urged in a counterclockwise direction by a spring 98 and is arranged to be connected to a gate 100 constituting the bottom of the bucket and which is pivoted to the side of the bucket, as illustrated. The connection between the second arm 96 of the bell crank and the gate 100 is by a curved arm 102 arranged with respect to the pivot for the bell crank so as to form in effect a toggle lock when the gate is closed and the second arm of the bell crank reposes against a fixed stop 104 on the side of the bucket. During the operation of the machine, when the presser foot or arm 90 engages the roll 92 it operates to break the toggle and through rotation of the bell crank against the spring to effect the pivotal opening of the bottom of the bucket. As long as the arm continues to bear against the roll the gate remains open, and when permitted to do so by the operating cam 76 the parts are returned to bucket closing position by the spring 98. The forked lever 86 affords a convenient adjustment for varying the throw of the gate operating arms. After the goods leave the bucket they are discharged through a guide chute 106 into the packages or containers 108 positioned beneath the outlets from the guide chutes.

Referring now to Figs. 2, 3 and 7, provision is made for controlling the vibration of the delivery conduits 12 so that vibration will cease when the scale has made its weight and in order to accumulate a supply of material in the hopper 30, before the succeeding weighing operation, the vibration of the material delivery conduits 12 is initiated shortly after the operation of dumping the goods from the weighing buckets 32 is effected. As herein shown, see Fig. 6, the vibration of each material delivery conduit is controlled through a switch 110 which is arranged to be closed by a cam 112 fixed on the cam shaft 48. The cam 112 cooperates with a roller 114 carried by a lever 116 which is pivoted on the shaft 64, and the lever 116 is connected to a second lever 118 by a rod 120. The lever 118 is fixed to a rocker shaft 122 and each weighing unit is provided with a depending lever 124 fixed to the shaft 122. Each lever 124 is provided with a set screw 125 which is arranged to engage a lug 126 extending from a lever 128 loosely mounted on the shaft 122. The lever 128, which forms the movable member of an electromagnet generally indicated at 130 is provided with an extension 132 which is adapted to cooperate with a roller 134 carried by the switch lever 136. As illustrated in Fig. 6 the cam lever 116 is provided with a second arm 138 to which a spring 140 is connected at one end, the other end being secured to the machine frame for the purpose of holding the roller 114 against its cam 112. A spring 142 normally urges the lever 128 downwardly so as to effect the opening of the switch 110 at the contacts 144, 146. During the operation of the machine, provision is made for retaining the lever 128 in its upward or closed position as shown in Fig. 6 during the weighing operation and as herein shown, see Figs. 3 and 7, each scale beam is provided with a double set of contacts, one set 73 and 74 as hereinbefore described which closes the circuit to the electromagnet 72 to hold the shutter 40 in its open position and a second set 147, 148 which is adapted to close the circuit to the electromagnet 130 which, when energized will hold the lever 128 in a position to close the circuit to the vibratory motor 20 at the contacts 144, 146. The cam 112 is designed to hold the switch 110 closed, to maintain the vibration of the material feeding conduit 12, before the scale beam 34 is returned to its normal position by the usual counterweight 132. When the scale beam returns to its weighing position the closing of the contacts 147, 148 will energize the electromagnet to retain the lever 128 in position to hold the switch 110 closed. It will therefore be seen that as soon as the contacts 147, 148 are opened, when the scale has made its weight, the electromagnet 130 will be de-energized and the switch 110 will be opened to stop the vibration of the vibratory motor 20.

From the description thus far, it will be seen that during the operation of the machine an accumulated load of material is built up in the hopper 30 during each cycle of operation of the machine preparatory to releasing the accumulated load into the weighing bucket 32 when the scale beam 34 has come to rest. The cam 46 for operating the shutter arm 42 to release the accumulated load is timed to operate after the scale beam has come to rest. At this time the electromagnet 72 will be energized to retain the shutter arm in its open position as hereinbefore described.

Provision is made for controlling the amplitude of vibration of the material feeding conduits and as herein shown, see Fig. 7, a rheostat 150 is provided in the circuit for each individual feeding unit which can be adjusted to vary the amount of goods delivered from the conduit. On the present multi-unit machine the different scales trip off when each has completed its proper weighing and consequently one vibrator may be operating alone with the other shut off. In order to maintain a constant rate of vibration regardless of how many vibrators are in operation an auto-transformer 152 is provided in the circuit as shown in Fig. 7, so that the output voltage remains practically constant for the particular setting used, irrespective of the resistance in the output circuit. With this construction, the amplitude of vibration will remain unchanged, regardless of how many vibrators are in operation.

The operation of the machine is controlled by a one revolution pawl and ratchet clutch which is permitted to make one revolution per cycle of operation of the machine when the scale beams of all of the units of the machine have made their weights. As illustrated, see Figs. 2, 8 and 9, the ratchet 154 is loosely mounted on a shaft 156 and is formed integrally with a gear 158 driven as will be described. A pawl 160 which cooperates with the ratchet is mounted on a pawl carrier disc 162 fixed to the shaft 156. As shown in Fig. 9, two pawl stops 164 and 166, slidingly mounted in a bracket 167 secured to the machine frame, are arranged to be withdrawn so that the machine can start on its next cycle of operation, when certain conditions have been accomplished, as will be described. The pawl stop 164 is arranged to be withdrawn when the packages 108 are positioned beneath the guide chutes 106 on the conveyor, and the pawl stop 166 is arranged to be withdrawn when all of the scales have made their weight. When each scale makes its weight the electromagnet 72 is de-energized to release the shutter arm 42. This movement of the shutter arm 42 is arranged to withdraw the pawl stop 166 through connections including a lever 168 fixed to a shaft 170, a second lever 172, also fixed to the shaft 170, which is connected to one arm 174 of a bell crank by a connecting rod 176. The second arm 178 of the bell crank is connected to the pawl stop 166 by a toggle link 180. The lever 168 is provided with a stud 182 at its lower end which engages an abutment 184 extending from the shutter arm 42 and the lever 168 is normally urged against the shutter arm 42 by a spring 186 one end of which is hooked into the lever and the other end to a stud 188 secured in the front of the hopper 30. It will be observed that each unit is provided with a lever 168 and from the construction as shown it will be seen that if only one scale trips off, its lever 168 will remain in its raised position, as shown in Fig. 8, until the remaining scale or scales have been tripped off or until the weights have been made. In this manner and through the connections described, the pawl stop 166 is withdrawn to permit the pawl 160 to engage the teeth of the ratchet 154 to thereby start a new cycle of operation. During this cycle, the shutter arms 42 are again opened to raise the levers 168 and consequently to place the pawl stop 166 in a position to engage the pawl 160 and hold the machine at rest until the end of the weighing operation. A spring 190 normally urges the bell crank arm 178 upwardly to assist in withdrawing the pawl 160.

The containers 108 are conveyed into the machine on a conveyor belt 192, which is driven in any usual or preferred manner, and provision is made for positioning the containers in groups beneath the weighing units and for releasing the containers after they have been filled to permit the next succeeding group of containers to be advanced to filling position. To this end a secondary cam shaft 194 is provided, which is driven from the cam shaft 48 by a chain 196 which runs over sprockets 198 and 200 secured to the shaft 48, 194 respectively. As herein shown, see Figs. 1 and 10, the containers are brought up against a pivotal stop arm 202 secured to a vertical rod 204 pivotally mounted in a rocker arm 206 fast on a rocker shaft 208. The stop arm 202 is normally in an angular position with respect to the incoming packages so that when the packages come to rest they will have moved the pivoted arm to a position parallel with the packages. This movement is transmitted to the second pawl stop 164 to withdraw it, through connections including a lever 210 fast on the lower end of the vertical rod 204 connected to one arm 212 of a bell crank by a rod 214. The second arm 216 of the bell crank, which is pivoted on a stud 218 extending from the conveyor frame, is connected by a connecting rod 224 to a lever 220 loosely mounted on the stud 222 adjacent the arm 178. The lever 220 is connected to the second pawl stop 164 by the toggle link 226. Through the connection described the pawl stop 164 will be withdrawn when the containers have arrived into position beneath the weighing units. In order to rock the stop arm lever 206 to release the filled containers a cam 228 secured to the cam shaft 194 is arranged to cooperate with a roller 230 mounted on an arm 232 secured to the rocker shaft 208 and the cam is designed to release the packages in timed relation to the weighing operations. Provision is made for delaying the admission of the succeeding group of packages until the filled packages have had time to pass by the stop arm 202 and to this end a second stop lever 234 is provided which is operated by a cam 236 mounted on the cam shaft 194. The second lever 234 is mounted fast on a rocker shaft 238 and a cam lever 240 also fast on the rocker shaft 238 carries a roller 242 which cooperates with the cam 236. The cam 236 is designed to permit one group of packages to advance to filling position when the preceding filled packages have passed beyond the stop arm 202 and to hold up the succeeding group of packages until the end of the weighing operation.

In order to permit the machine to be manually stopped a hand lever 244 is connected to the pawl stop arm 178 by a connecting rod 246. When the hand lever is raised the rod 246 slides freely through a hole in the swivel connection 248 and when the lever is lowered to the position shown in Fig. 8, the swivel connection engages a collar 250 secured to the rod 246 to hold in the pawl stop 166.

The weighing machine is driven from a motor 252, as best shown in Fig. 1, through connections including a belt 254, a pulley 256 on the motor shaft 258, and large pulley 260 on a counter shaft 262. Referring now to Figs. 8 and 9, the counter shaft 262 is provided with a pinion 264 fast thereon which is arranged to drive the ratchet gear 158 through the gear train 266, 268, and 270. As shown in Fig. 9, the pawl carrier disc 162 is provided with a gear 272 formed integrally therewith which is arranged to mesh with a gear 274 fast on the cam shaft 48.

The operation of the machine may be briefly summarized as follows: The first operation is the dumping of the previously weighed loads from the weighing buckets 32 into the packages 108 positioned beneath the guide chutes 106. Directly thereafter or simultaneously therewith, the cam 112 operates to close the switch 110 to initiate the vibration of the material feeding conduits 12. The shutters 40 are at this time in closed positions, and during the period when the loads are being dumped from the weighing buckets, a partial load is being accumulated in each of the hoppers 30. When the scale beams 34 have returned to weighing position, the shutter arms 42 are raised to open the shutters 40 weighing buckets 32. The shutters 40 remain and deposit the accumulated material into the open, and the vibration of the material feeding conduits continues until the scales have made their weights whereupon the shutters 40 are closed and the vibration ceases. At the end of the weighing operation, the pawl stop 166 is withdrawn from the pawl 160 and the machine is permitted to start on its succeeding cycle of operation, assuming that the packages 108 are in position on the conveyor belt 192, and have operated to withdraw the second pawl stop 164.

While the preferred embodiment of the invention has been herein illustrated and described, it will be understood that the invention may be embodied in other forms within the scope of the following claims.

Having thus described the invention what is claimed is:

1. In a multiple unit weighing machine, in combination, a plurality of units, each comprising a scale and a vibratory conduit for feeding material to said scale, controlling means for controlling the amplitude of vibration for each individual conduit and a master controlling element adapted to increase or decrease the amplitude of vibration of all of the conduits simultaneously including means for maintaining the amplitude of vibration of the remaining conduits substantially constant when the amplitude of vibration of an individual conduit is changed.

2. In a multiple unit weighing machine, in combination, a plurality of units, each comprising the scale and a vibratory conduit for feeding material to said scale, controlling means for controlling the amplitude of vibration for each individual conduit and a master controlling element adapted to increase or decrease the amplitude of vibration of all of the conduits simultaneously, said master controlling element having provision for maintaining a constant rate of vibration of the remaining conduits when the vibration of one is terminated.

3. In a multiple unit weighing machine, in combination, a plurality of units each comprising a scale, a vibratory conduit for feeding material to said scale, control means for controlling the amplitude of vibration for each individual conduit including means for discontinuing the vibration of each individual conduit when the scale has made its weight and a master controlling element adapted to maintain a constant rate of vibration in the remaining units when the vibration of one unit has been discontinued.

4. In a multiple unit weighing machine, in combination, a plurality of units each comprising a scale and a vibratory conduit for feeding material to said scale, control means for controlling the amplitude of vibration of each individual conduit including means for discontinuing the vibration of each individual conduit when the scale has made its weight and control means having provision for preventing the rate of vibration of the remaining conduits from increasing after the vibration of one unit has been discontinued.

5. In a multiple unit weighing machine, in combination, a plurality of units each comprising a scale and an electrically vibrated conduit for feeding the material to said scale, and an electric circuit for controlling the vibration of said vibratory conduits including an individual rheostat for controlling the amplitude of vibration of each individual conduit and an autotransformer for maintaining a constant output voltage in said circuit irrespective of the decrease of resistance in said circuit.

STANLEY R. HOWARD.